US009306855B2

(12) United States Patent  
Dutta et al.

(10) Patent No.: US 9,306,855 B2  
(45) Date of Patent: Apr. 5, 2016

(54) SYSTEM AND METHOD FOR USING LABEL DISTRIBUTION PROTOCOL (LDP) IN IPV6 NETWORKS

(71) Applicants: Pranjal K Dutta, Mountain View, CA (US); Mustapha Aissaoui, Ottawa (CA)

(72) Inventors: Pranjal K Dutta, Mountain View, CA (US); Mustapha Aissaoui, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 286 days.

(21) Appl. No.: 13/857,137

(22) Filed: Apr. 4, 2013

(65) Prior Publication Data

US 2013/0266013 A1 Oct. 10, 2013

Related U.S. Application Data

(60) Provisional application No. 61/620,279, filed on Apr. 4, 2012.

(51) Int. Cl.
- *H04L 12/801* (2013.01)
- *H04L 12/703* (2013.01)
- *H04L 12/723* (2013.01)

(52) U.S. Cl.
CPC ............... *H04L 47/12* (2013.01); *H04L 45/28* (2013.01); *H04L 45/507* (2013.01); *H04L 45/50* (2013.01)

(58) Field of Classification Search
None
See application file for complete search history.

(56) References Cited

U.S. PATENT DOCUMENTS

2006/0062218 A1* 3/2006 Sasagawa ............... H04L 45/04  
370/389

OTHER PUBLICATIONS

Andersson et al. "LDP Specification; rfc5036.txt", Oct. 1, 2007, XP015055108 ISSN: 0000-0003, submitted as prior art by the applicant.D06F*  
Andersson et al. "LDP Specification; rfc5036.txt", Oct. 1, 2007, XP015055108 ISSN: 0000-0003.*  
Yangfaming ZTE Corp. 5/F et al. "A Proposal on Redefinition of TTSI structure; D 66", ITU-T Draft Study Period 2005-2008, International Telecommunication Union, Geneva; CH, vol. Study Group 13, Dec. 7, 2004, pp. 1-2.*  
Dutta, "LDP Version 2; draft-pdutta-mpls-ldp-v2-00.txt", LDP Version 2; Draft-PDutta-MPLS-LDP-V2-00.tst, Internet Engineering Task Force, IETF; StandardWorkingDraft, Internet Society (ISOC) 4, Apr. 5, 2012, pp. 1-7, submitted as prior art by the applicant.*  
Andersson et al. "LDP Specification: rfc5036.txt", Oct. 1, 2007, XP015055108 ISSN: 0000-0003.*  
Yangfaming ZTE Corp. 5/F et al. "A Proposal on Redefinition of TTSI structure; D 66", ITU-T Draft Study Period 2005-2208, International Telecommunication Union, Geneva; CH, vol. Study Group 13, Dec. 7, 2004, pp. 1-2.*  
Dutta, "LDP Version 2: draft-pdutta-mpls-ldp-v2-00.txt", LDP Version 2; Draft-PDutta-MPLS-LDP-V2-00.tst, Internet Engineering Task Force, IETF; Standard Working Draft, Internet Society (ISOC) 4, (April 5, 2012, pp. 1-7, submitted as prior art by the applicant.*  
Jul. 16, 2013 The International Search Report and the Written Opinion of the International Searching Authority, or the Declaration in PCT/US2013/035344, Alcatel-Lucent USA Inc., Applicant, 12 pages.

(Continued)

*Primary Examiner* — Andrew Lai  
*Assistant Examiner* — Jamaal Henson  
(74) *Attorney, Agent, or Firm* — Tong, Bea, Bentley & Kim, LLP

(57) ABSTRACT

A method and apparatus for generating an IPv6 compliant label distribution protocol (LDP) control plane packet at a Label Switched Router (LSR).

12 Claims, 4 Drawing Sheets

(56) References Cited

OTHER PUBLICATIONS

Anderson L et al: "LDP Specification; rfc 5036.txt", 2071001, Oct. 1, 2007, XP015055108, ISSN: 0000-0003.

Kamran Raza: "Re [mpls] Comments on draft-ietf-mplsldp-ipv6-06", Mar. 1, 2012, pp. 1-6, XP055069960, Retrieved from the Internet: URL:http://www.ietf.org/mail-archive/web/mpls/current/msg07790.htm] [retrieved on Jul. 5, 2013].

Yangfaming ZTE Corporation 5/F et al: "A Proposal on redefinition of TTSI structure; D 66", ITU-T Draft Study Period 2005-2008, International Telecommunication Union, Geneva; CH, vol. Study Group 13, Dec. 7, 2004, pp. 1-2, XP017406308.

Dutta M Aissaoui Alcatel-Lucent P: "LDP Version 2; draft-pdutta-mpls-ldp-v2-00.txt", LDP Version 2; draft-Pdutta-Mpls-LDP-V2-00.txt, Internet Engineering Task Force, IETF; StandardWorkingDraft, Internet Society (ISOC) 4, Rue Des Falaises CH-1205 Geneva, Switzerland Apr. 5, 2012, pp. 1-7, XP015082305, [retrieved on Apr. 5, 2012].

Rajiv Asati Cisco Vishwas Manral Hewlett-Packard et al: "Updates to LDP for IPv6; draft-ietf-mpls-ldp-ipv6-06.txt", Updates to LDP for IPV6; draft-ietf-mpls-ldp-ipv6-06.txt, Internet Engineering Task Force, IETF; StandardWorkingDraft, Internet Society (ISOC) 4, Rue Des Falaises CH-1205 Geneva, Switzerland, Jan. 24, 2012, pp. 1-17, XP015080321, [retrieved on Jan. 24, 2012].

Office Action received in corresponding Korean application No. 2014/7027896, dated Apr. 8, 2015, pp. 1-10.

Amante et al., "Re: [mpls]Comments on draft-ietf-mpls-ldp-ipv6-06," https://www.ietf.org/mail-archive/web/mpls/current/msg07790.html, Mar. 1, 2012, 7 pages.

ZTE Corporation, "A Proposal on redefinition of TTSI structure," International Telecommunication Union, Telecommunication Standardization Sector, COM 13—D 66-E, Dec. 7, 2004, 2 pages.

Andersson et al., "LDP Specification," RFC 5036, Oct. 2007, 135 pages.

\* cited by examiner

```
                          1                   2                   3
      0 1 2 3 4 5 6 7 8 9 0 1 2 3 4 5 6 7 8 9 0 1 2 3 4 5 6 7 8 9 0 1
     +-+-+-+-+-+-+-+-+-+-+-+-+-+-+-+-+-+-+-+-+-+-+-+-+-+-+-+-+-+-+-+-+
225  |  VERSION (2)                  |         PDU LENGTH            |     235
     +-+-+-+-+-+-+-+-+-+-+-+-+-+-+-+-+-+-+-+-+-+-+-+-+-+-+-+-+-+-+-+-+
230  |                       LDP IDENTIFIER                          |
     +-+-+-+-+-+-+-+-+-+-+-+-+-+-+-+-+-+-+-+-+-+-+-+-+-+-+-+-+-+-+-+-+
     |                     LDP IDENTIFIER (CONTD.)                   |
     +-+-+-+-+-+-+-+-+-+-+-+-+-+-+-+-+-+-+-+-+-+-+-+-+-+-+-+-+-+-+-+-+
     |                     LDP IDENTIFIER (CONTD.)                   |
     +-+-+-+-+-+-+-+-+-+-+-+-+-+-+-+-+-+-+-+-+-+-+-+-+-+-+-+-+-+-+-+-+
     |                     LDP IDENTIFIER (CONTD.)                   |
     +-+-+-+-+-+-+-+-+-+-+-+-+-+-+-+-+-+-+-+-+-+-+-+-+-+-+-+-+-+-+-+-+
     | LDP IDENTIFIER (CONTD.)       |
     +-+-+-+-+-+-+-+-+-+-+-+-+-+-+-+-+
```

FIG. 2

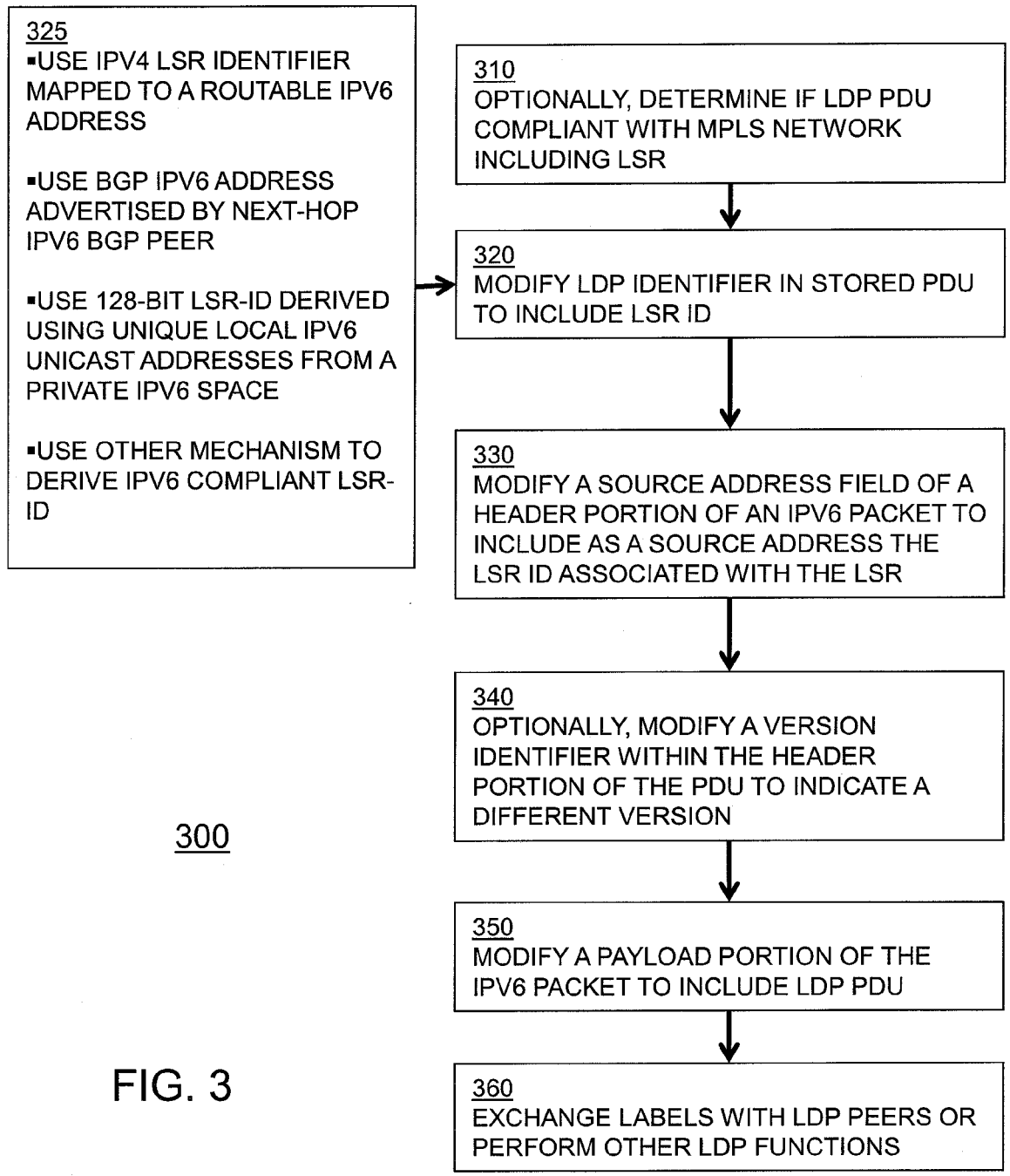

SYSTEM AND METHOD FOR USING LABEL DISTRIBUTION PROTOCOL (LDP) IN IPV6 NETWORKS

CROSS-REFERENCE TO RELATED APPLICATION

This application claims the benefit of U.S. Provisional Patent Application Ser. No. 61/620,279, filed Apr. 4, 2012, entitled SYSTEM, METHOD AND APPARATUS FOR IMPROVED MPLS, which application is incorporated herein by reference in its entirety.

FIELD OF THE INVENTION

The invention relates to the field of communication networks such as multi-protocol label switching (MPLS) networks and, more particularly but not exclusively, to LSR identifiers in IPv6 networks.

BACKGROUND

Multiprotocol Label Switching (MPLS) enables efficient delivery of a wide variety of differentiated, end-to-end services. The Internet Engineering Task Force (IETF) describes architecture for Multiprotocol Label Switching (MPLS) in its Request for Comment (RFC) document denoted as RFC 3031, and entitled "Multiprotocol Label Switching Architecture."

A fundamental concept in MPLS is that two Label Switching Routers (LSRs) must agree on the meaning of the labels used to forward traffic between and through them. This common understanding is achieved by using a set of procedures, called a label distribution protocol, by which one Label Switch Router (LSR) informs another of label bindings it has made. This document defines a set of such procedures called LDP (for Label Distribution Protocol) by which LSRs distribute labels to support MPLS forwarding along normally routed paths.

SUMMARY

A method and apparatus for generating an IPv6 compliant label distribution protocol (LDP) control plane packet at a Label Switched Router (LSR). Specifically, various embodiments utilize a LSR ID to both identify an LSR and as a IPv6 source address for the LSR. By constraining the LSR ID to, illustratively, a 128 bit IPv6 compliant address (e.g., a routable long address), there is no need to perform intermediate address translation steps such as IPv4/IPv6 mapping and the like.

One embodiment provides a method for generating an IPv6 compliant label distribution protocol (LDP) control plane packet at a Label Switched Router (LSR), the method comprising: storing, in a memory of the LSR, at least a header portion of a LDP Protocol Data Unit (PDU) associated with the control plane packet; modifying an LDP Identifier in the stored PDU header to include therein a LSR Identifier associated with the LSR; modifying a source address field of a header portion of an IPv6 packet to include as a source address the LSR Identifier associated with the LSR; modifying a payload portion of the IPv6 packet to include the LDP PDU; and forwarding the IPv6 packet toward a destination LSR.

BRIEF DESCRIPTION OF THE DRAWINGS

The teachings of the present invention can be readily understood by considering the following detailed description in conjunction with the accompanying drawings, in which:

FIG. 2 depicts a new LDP Protocol Data Unit (PDU) Header according to one embodiment;

FIG. 3 depicts a flow diagram of a method according to one embodiment; and

To facilitate understanding, identical reference numerals have been used, where possible, to designate identical elements that are common to the figures.

DETAILED DESCRIPTION

Figure 1:
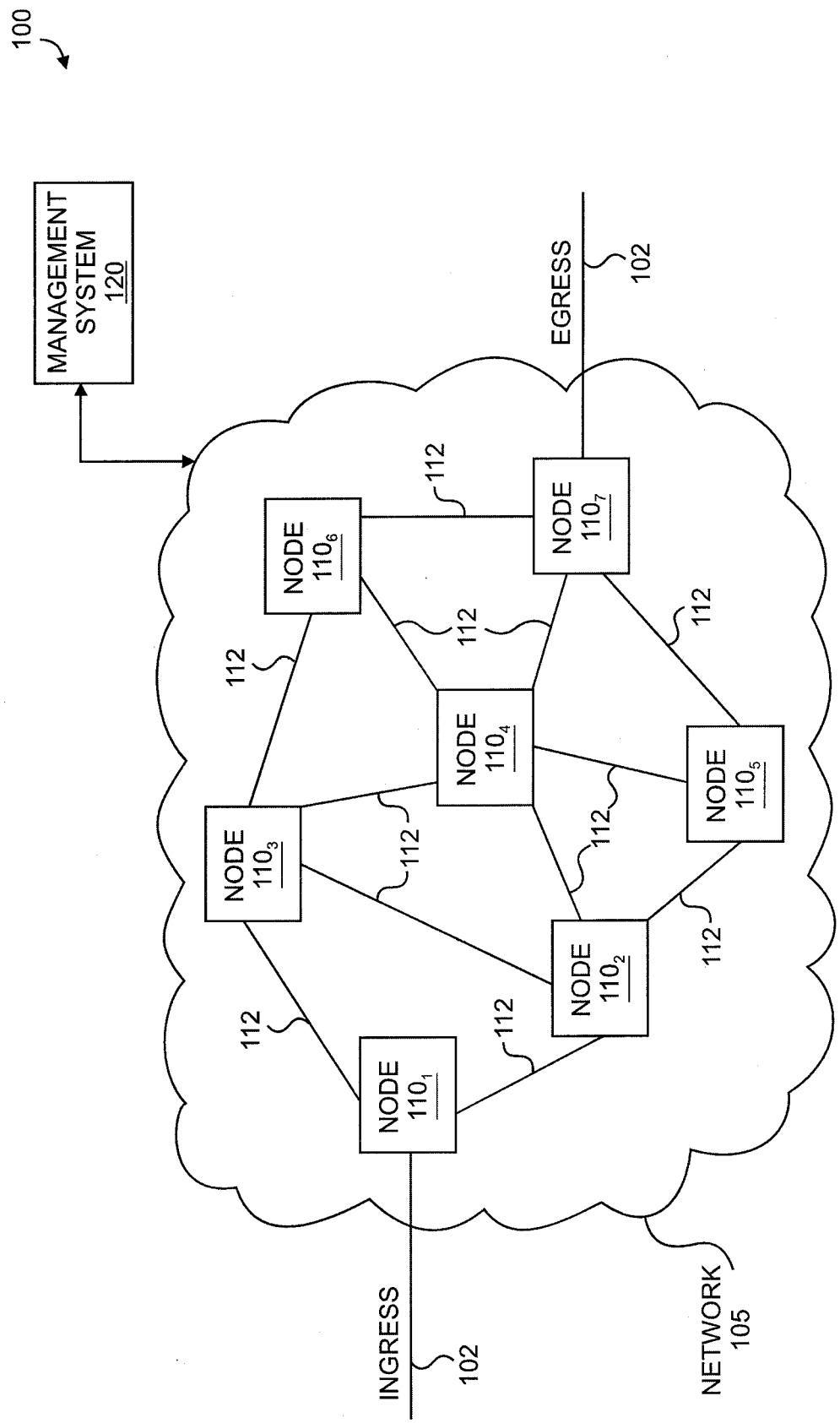
FIG. 1 depicts an exemplary network benefiting from the various embodiments.

Various embodiments will be described within the context of a network supporting Multi-Protocol Label switching (MPLS), such as defined in IETF RFC3031 and RFC5036, each of which is herein incorporated by reference in its respective entirety.

LDP (Label Distribution Protocol) is a signaling protocol for set up and maintenance of MPLS LSPs (Label Switched Paths). LDP is a protocol defined for distributing labels for setting up LSPs. LDP comprises the set of procedures and messages by which LSRs establish Label Switched Paths (LSPs) through a network by mapping network-layer routing information directly to data-link layer switched paths. These LSPs may have an endpoint at a directly attached neighbor (comparable to IP hop-by-hop forwarding), or may have an endpoint at a network egress node, enabling label switching via all intermediary nodes.

RFC 5036 defines the LDP Version 1 and all its related procedures. Two Label Switched Routers (LSR) that use LDP as a method to exchange label/FEC mapping information are known as "LDP Peers" with respect to that information, and it is commonly referred to as there being an "LDP Session" between them. A single LDP session allows each peer to learn the other's label mappings. Each LSR node is indentified by an LDP identifier. In LDP Version 1, an LDP Identifier is a six octet quantity used to identify an LSR label space. The 4 octets identify the LSR and is a globally unique value which acts like a 32-bit router ID assigned to the LSR. The last two octets identify a specific label space within the LSR. The last two octets of LDP Identifiers for platform-wide label spaces are always both zero. Various embodiments use the following representation for LDP Identifiers:

<LSR Id>:<label space id> e.g., lsr171:0, lsr19:2 etc

Although RFC 5036 does not specify that the 4 byte LSR-ID of the LDP identifier be in the format of an IPv4 address or even be routable, many deployments do so specify and derive LSR-ID from a well-known ‖Pv4 loopback interface address in the system. The main reason for this use is to allow routing protocols, MPLS signaling and OAM protocols to come up using a default routable system address to provide various seamless MPLS based solutions within the system.

In an all IPv6 network, a similar capability is needed as it is hardly justifiable to have operators of the above deployments keep two sets of identifiers (4 byte LSR-ID and corresponding IPv6 addresses) and maintain a mapping between them. Additionally, such mappings of identifiers between each functional module are also fault prone and increases operational complexity.

Even in all IPv6 network deployments where a mapping of an LSR-ID to a routable IPv6 address will be used, it is more flexible to use a 128-bit LSR-ID, which can come from the private IPv6 space of the operator using Unique Local IPv6

Unicast Addresses. The 128-bit LSR-ID is herein referred to as a routable long address whereas the 32-bit is referred to as a short address.

Although the 128-bit LSR-ID is primarily depicted and described with respect to a routable long LSR-ID, other bit-wise lengths such as 256-bit, 512-bit and so on can be referred to as long LSR-ID. Thus, in multi-service deployments with IPv6, it is almost a mandate that LDP LSR-ID be derived from a routable IPv6 address.

Finally, in deployments of L2 VPNs (Layer 2 Virtual Private Networks) using BGP (Border Gateway Protocol) auto-discovery (defined inRFC 6074) and in deployments of Dynamic Multi-Segment Pseudo-wire (MS-PW) (defined in ietf-pwe3-dynamic-ms-pw), the BGP next-hop advertised by an IPv6 BGP peer is going to be a routable IPv6 address and is the least common denominator for all co-existing BGP NLRIs (Network Layer Reachability Information). In this case, an auto-instantiated Targeted LDP (T-LDP) session to the BGP peer will map this address to associate with LSR-ID of the peer.

Existing 32-bit LSR ID does not lend itself to be mapped to LDP LSR-ID in IPv6 networks. Therefore, a 128 bit LSR-ID, which can be mapped to routable IPv6 address is preferred. This 128 bit LSR-ID is also identified with any LDP version higher than version 1. Such a solution is more commercially viable as it can be built on existing LDP implementations.

Various embodiments provide another LDP Version herein referred to as LDP Version 2 (V2) defining a 128-bit LDP LSR-ID. LDP V2 can be deployed in existing IPv4 based networks as well. The various embodiments provide a method for implementing routable LDP LSR-ID in an IPv6 network. The LSR-ID is a 128 bit identifier mapped to a routable IPv6 address and is identified with any LDP version number that is available after version 1. This arrangement allows operational flexibility to operators when a single IPv6 address in a node is mapped for all seamless MPLS solutions configured in the network node.

As used herein, the term Label Distribution Protocol (LDP) Protocol Data Unit (PDU) refers to LDP control plane packet including a header portion adapted according to the various embodiments, and a payload portion including LDP messages, message data and the like (e.g., such as discussed in IETF RFC 5036). Similarly, an IPv6 compliant label distribution protocol (LDP) control plane packet comprises an IPv6 packet including a LDP PDU or LDP control plane packet.

In general, various embodiments utilize a LSR ID to both identify an LSR and as a IPv6 source address for the LSR. By constraining the LSR ID to, illustratively, a 128 bit IPv6 compliant address (e.g., a routable long address), there is no need to perform intermediate address translation steps such as IPv4/IPv6 mapping and the like. In this manner, computing, memory and input/output resources associated with such intermediate address translation steps are conserved. This becomes especially useful within the context of platform such as network elements including therein multiple instantiated LSRs and LDP sessions. Generally speaking, according to various embodiments an LDP session is instantiated using the LSR ID of the corresponding LSR such that the LSR ID is used in the LDP PDU header (LSR ID within LDP identifier field) as well as the IPv6 header (source address field).

FIG. 1 depicts a high-level block diagram of a communication network benefiting from various embodiments. Specifically, the communication network 100 of FIG. 1 includes a plurality of nodes $110_1$-$110_7$ (collectively, nodes 110). The nodes 110 support various combinations of network interfaces NIs 112 and/or external interfaces (EIs) 102. Nodes 110 communicate with external devices (e.g., nodes of other network domains, user devices, and the like) using EIs 102. NIs 112 may include network links. EIs 102 may include external links.

The nodes 110 include communication nodes supporting packet-based communications. In one embodiment, nodes 110 include communication nodes supporting any communication technologies supporting multicast capabilities, such as Internet Protocol (IP), Multiprotocol Label Switching (MPLS), Ethernet, and the like, as well as various combinations thereof. The NIs 112 and EIs 102 include interfaces supporting any communication technologies supported by associated nodes 110.

Although primarily depicted and described herein with respect to a communication network having specific types, numbers, and configurations of nodes 110, NIs 112, and EIs 102, the present embodiments may be implemented in communication networks having various other types, numbers, and configurations of nodes 110, NIs 112, and EIs 102. Similarly, although primarily depicted and described herein with respect to specific multicast communication technologies, the present invention may be implemented using various other unicast communication technologies, multicast communication technologies, and the like, as well as various combinations thereof.

As depicted in FIG. 1, for a network of N nodes (LSRs), each node is assigned a 128-bit unique global identifier. The 128 bit LSR-ID is assigned to the LSR and is also used to identify the LSR in Loop Detection Path Vectors. The last two octets identify a label space within the LSR. For a platform-wide label space, these are both zero.

Figure 4:
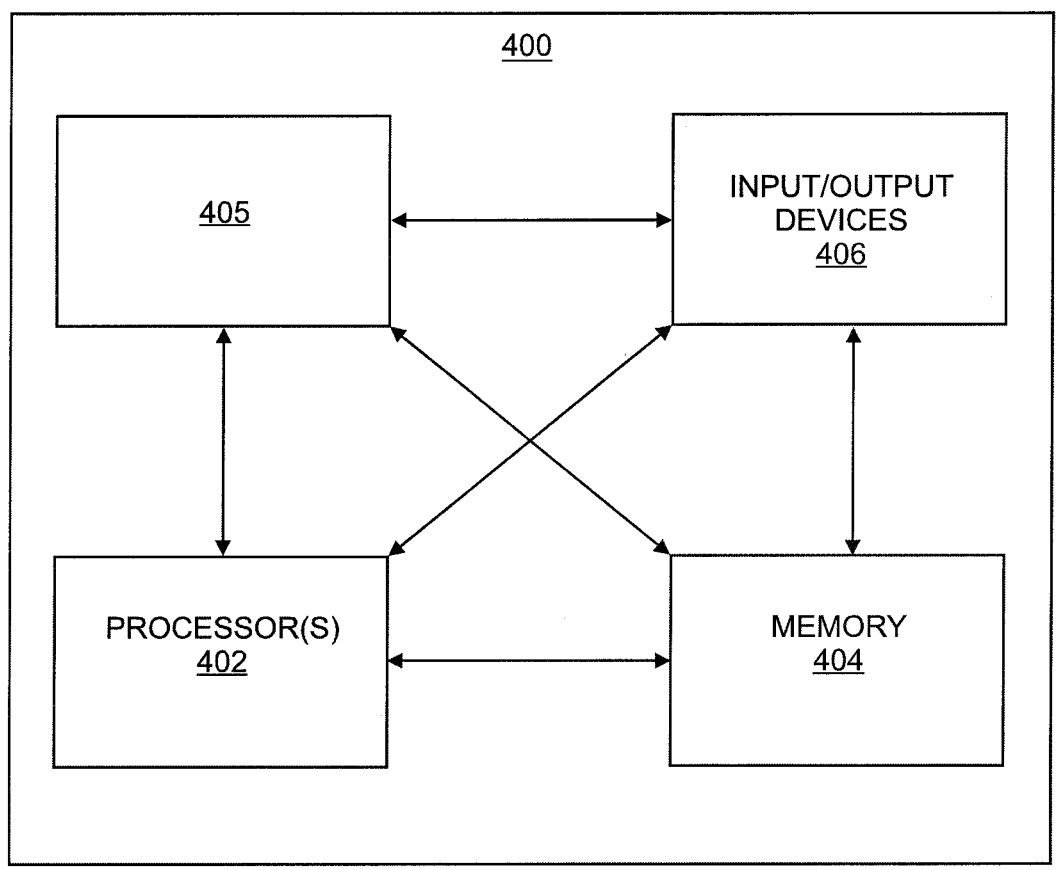
FIG. 4 depicts a high-level block diagram of a computing device, such as a processor in a telecom network element, suitable for use in performing functions described herein.

The operation of nodes 110 may be further understood with respect to FIGS. 2-4 as depicted and described herein.

The network may be modified by those skilled in the art to use other MPLS related protocols rather that the exemplary protocol discussed herein.

Network 100 includes an IP/MPLS communication network (CN) 105 and at least one network management system (NMS) 120 operative to, illustratively, route traffic between an originating Edge LSR 110-1 and a destination Edge LSR 110-7 via one or more label switched paths (LSPs).

As depicted, NMS 120 is operative to control a plurality of routers 110 forming the CN 105; namely, a plurality of Label Switched Routers (LSRs) 110-1 through 110-7. It will be noted that while only seven LSRs are depicted, CN 105 may include many more LSRs. The representation of CN 105 is simplified for purposes of this discussion.

The NMS 120 is a network management system adapted for performing the various management functions described herein. The NMS 120 is adapted to communicate with nodes of CN 105. The NMS 120 may also be adapted to communicate with other operations support systems (e.g., Element Management Systems (EMSs), Topology Management Systems (TMSs), and the like, as well as various combinations thereof).

The NMS 120 may be implemented at a network node, network operations center (NOC) or any other location capable of communication with the CN 105 and various elements related thereto. The NMS 120 may support user interface capabilities to enable one or more users to perform various network management, configuration, provisioning or control related functions (e.g., enter information, review information, initiate execution of various methods as described herein and the like). Various embodiments of the NMS 120 are adapted to perform functions as discussed herein with respect to the various embodiments. The NMS 120 may be implemented as a general purpose computing device or specific purpose computing device, such as described below with respect to FIG. 4.

The NMS 120 and the various routers 110 operate to support routable LDP LSR-ID in an IPv6 network. The Multi-Protocol Label Switching (MPLS) architecture is described in RFC3031 in IETF. Label Distribution Protocol (LDP) is a signaling protocol for setup and maintenance of MPLS LSPs (Label Switched Paths) and the protocol specification is defined in RFC5036 in IETF.

LDP (Label Distribution Protocol) is a signaling protocol for set up and maintenance of MPLS LSPs (Label Switched Paths). LDP is a protocol defined for distributing labels for setting up LSPs. It comprises of the set of procedures and messages by which LSRs establish Label Switched Paths (LSPs) through a network by mapping network-layer routing information directly to data-link layer switched paths. These LSPs may have an endpoint at a directly attached neighbor (comparable to IP hop-by-hop forwarding), or may have an endpoint at a network egress node, enabling label switching via all intermediary nodes.

LDP associates a Forwarding Equivalence Class (FEC) with each LSP it creates. The FEC associated with an LSP specifies which packets are "mapped" to that LSP. This FEC is the "context" of a label. LSPs are extended through a network as each LSR "splices" incoming labels for a FEC to the outgoing label assigned by the next hop for the given FEC.

FIG. 2 depicts a general format of an exemplary LDP Protocol Data Unit (PDU) Header according to one embodiment. Specifically, in various embodiments, each LDP PDU includes an LDP Header of a format substantially as shown in FIG. 2, followed by one or more LDP messages (not shown). As shown in FIG. 2, a LDP Protocol Data Unit (PDU) Header 200 generally includes a Version Identifier Field 225, a PDU Length Field 235 and an LDP Identifier Field 230.

LDP Version Identifier Field 225 identifies the LDP version (e.g., 1 for IPv4, 2 or more for IPv6, etc.), while PDU Length Field 235 indicates the PDU length.

LDP Identifier Field 230 comprises, illustratively, an eighteen octet field including information that uniquely identifies the label space of the sending LSR for which the PDU applies. The first 16 octets identify the LSR and are to be globally unique value. The 128 bit LSR-ID is assigned to the LSR and is also used to identify it in Loop Detection Path Vectors. The last two octets identify a label space within the LSR. For a platform-wide label space, these are both zero.

All protocol related procedures defined for LDP Version 1 in RFC5036 and its subsequent extensions are applicable to Version 2, except the fact that substantially all Messages carry the PDU header as described above.

LDP version 2 may be deployed in IPv6 only networks where an operator may map routable IPv6 addresses to 128 bit router-id in LDP Identifier. LDP Version 2 may be also deployed in IPv4 networks where LSR-ID is routable, by mapping IPv4 Addresses to the 128 bit LSR-ID, thus can accommodate all existing applications based on LDP version 1. In such a case implementation must follow "IPv4-mapped|Pv6 address" procedures defined in RFC2373.

FIG. 3 depicts a method according to one embodiment. Specifically, FIG. 3 depicts a method 300 suitable for use at a Label Switched Router (LSR) in a Multiprotocol Label Switching (MPLS) network for generating an IPv6 compliant label distribution protocol (LDP) control plane packet (i.e., an LDP PDU for transport via an IPv6 packet)

At optional step 310, a determination is made as to whether a Label Distribution Protocol (LDP) Protocol Data Unit (PDU) used for exchanging label information with peer LSRs is compliant with the MPLS network including the LSR (e.g., IPv4, IPv6 and so on). For example, an LSR previously using LDP version 1 mechanisms such as those adapted for use in an IPv4 MPLS network may be connected partially or entirely with an IPv6 MPLS network such that prior configurations should be adapted as discussed above with respect to the various figures.

At step 320, an LDP Identifier within a header portion of a PDU stored in the LSR memory is modified as necessary to include an IPv6 compliant routable long address for use as an LSR identifier. In various embodiments, the LSR identifier may be used to instantiate a corresponding LDP session.

Referring to box 325, in various embodiments the routable long address used may comprise an IPv4 LSR identifier of the LSR mapped to a routable IPv6 address, a BGP IPv6 address of the LSR as advertised by a next hop IPv6 BGP peer, a 128 bit LSR ID derived using a local IPv6 unicast addresses from a private IPv6 space, or some other mechanism to derive an IPv6 compliant LSR identifier. For example, the LSR ID may be preassigned in some manner, or a default LSR ID may be used until conflict. Various mechanisms and modifications associated with this step are addressed above with respect to the various figures.

At step 330, a source address field of the header portion of an IPv6 packet is modified to include as a source address the LSR ID associated with the LSR. Specifically, the LSR ID is used to both identify the LSR within the context of the LDP PDU header and as a IPv6 source address for the LSR. By constraining the LSR ID to, illustratively, a 128 bit IPv6 compliant address (e.g., a routable long address), there is no need to perform intermediate address translation steps such as IPv4/IPv6 mapping and the like.

At optional step 340, a Version Identifier within the header portion of the PDU stored in the LSR is modified as necessary to indicate a different version number. For example, when migrating from an IPv4 environment to an IPv6 environment, the version of LDP use by the LSR may change from version 1 to a later version (e.g., 2, 3 etc.). This optional step is especially useful where the later version is associated with specific LDP PDU formats, mechanisms and the like, such as described herein with respect to the various embodiments.

At step 350, the payload portion of the IPv6 packet is modified to include the LDP PDU to form thereby an IPv6 compliant LDP control plane packet.

At step 360, using the above-described IPv6 compliant LPD control plane packet (and mechanism for generating such packet), labels and other messages or information may be exchanged with LDP peers in communication with the LSR to perform various functions, such as exchanging discovery messages, session messages, advertising messages, notification messages and the like.

FIG. 4 depicts a high-level block diagram of a computing device, such as a processor in a telecom network element, suitable for use in performing functions described herein such as those associated with the various elements described herein with respect to the figures.

As depicted in FIG. 4, computing device 400 includes a processor element 403 (e.g., a central processing unit (CPU) and/or other suitable processor(s)), a memory 404 (e.g., random access memory (RAM), read only memory (ROM), and the like), a cooperating module/process 405, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 405 can be loaded into memory 404 and executed by processor 403 to implement the functions as discussed herein. Thus, cooperating process 405 (including associated data structures) can be stored on a computer readable storage medium, e.g., RAM memory, magnetic or optical drive or diskette, and the like.

It will be appreciated that computing device 400 depicted in FIG. 4 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for generating an IPv6 compliant label distribution protocol (LDP) control plane packet at a Label Switched Router (LSR), said method comprising:
    storing, in a memory of said LSR, at least a header portion of a LDP Protocol Data Unit (PDU);
    modifying an LDP Identifier in said stored PDU header to include therein a LSR Identifier associated with said LSR;
    modifying a source address field of a header portion of an IPv6 packet to include as a source address said LSR Identifier associated with said LSR;
    modifying a payload portion of said IPv6 packet to include said LDP PDU; and
    forwarding said IPv6 packet toward a destination LSR.

2. The method of claim 1, wherein said LSR Identifier comprises an IPv6 compliant routable long address.

3. The method of claim 2, wherein said IPv6 compliant routable long address comprises a Border Gateway Protocol (BGP) next-hop routable IPv6 address advertised by an IPv6 BGP peer.

4. The method of claim 2, wherein said IPv6 compliant routable long address comprises a 128-bit LSR ID derived using Unique Local IPv6 Unicast Addresses from a private IPv6 space of a network operator.

5. The method of claim 1, wherein said LSR Identifier is adapted for identifying the LSR in Loop Detection Path Vectors.

6. The method of claim 1, further comprising modifying a Version Identifier in said stored PDU header to include a version number greater than one.

7. The method of claim 1, wherein said steps are performed by each of a plurality of LSRs in an MPLS network.

8. The method of claim 7, wherein said MPLS network comprises an IPv6 network.

9. The method of claim 1, wherein said LSR comprises one of a plurality of LSRs instantiated at a network element.

10. A telecom network element comprising a processor configured for generating an IPv6 compliant label distribution protocol (LDP) control plane packet at a Label Switched Router (LSR), the processor configured for:
    storing, in a memory of said LSR, at least a header portion of a LDP Protocol Data Unit (PDU);
    modifying an LDP Identifier in said stored PDU header to include therein a LSR Identifier associated with said LSR;
    modifying a source address field of a header portion of an IPv6 packet to include as a source address said LSR Identifier associated with said LSR;
    modifying a payload portion of said IPv6 packet to include said LDP PDU; and
    forwarding said IPv6 packet toward a destination LSR.

11. A non-transitory computer-readable storage medium storing instructions which, when executed by a computer, adapt the operation of the computer to provide a method for generating an IPv6 compliant label distribution protocol (LDP) control plane packet at a Label Switched Router (LSR), the method comprising:
    storing, in a memory of said LSR, at least a header portion of a LDP Protocol Data Unit (PDU);
    modifying an LDP Identifier in said stored PDU header to include therein a LSR Identifier associated with said LSR;
    modifying a source address field of a header portion of an IPv6 packet to include as a source address said LSR Identifier associated with said LSR;
    modifying a payload portion of said IPv6 packet to include said LDP PDU; and
    forwarding said IPv6 packet toward a destination LSR.

12. A computer program product comprising a non-transitory computer-readable storage medium storing computer instructions which, when executed by a processor in a telecom network element, adapt the operation of the telecom network element to provide a method for generating an IPv6 compliant label distribution protocol (LDP) control plane packet at a Label Switched Router (LSR), the method comprising:
    storing, in a memory of said LSR, at least a header portion of a LDP Protocol Data Unit (PDU);
    modifying an LDP Identifier in said stored PDU header to include therein a LSR Identifier associated with said LSR;
    modifying a source address field of a header portion of an IPv6 packet to include as a source address said LSR Identifier associated with said LSR;
    modifying a payload portion of said IPv6 packet to include said LDP PDU; and
    forwarding said IPv6 packet toward a destination LSR.

* * * * *